2 Sheets—Sheet 1.

R. WRIGHT.

Assignor by mesne Assignments to R. H. & C. M. AVERY.

STALK-CHOPPER.

No. 7,336. Reissued Oct. 3, 1876.

Witnesses:
M. H. Barringer
P. R. Richards

Inventor:
Reuben Wright,
By W. B. Richards,
Atty.

N. PETERS, PHOTO-LITHOGRAPHER, WASHINGTON, D. C.

2 Sheets—Sheet 2.

R. WRIGHT.

Assignor by mesne Assignments to R. H. & C. M. AVERY.

STALK-CHOPPER.

No. 7,336. Reissued Oct. 3, 1876.

Witnesses:
Wm. H. Barringer.
P. R. Richards.

Inventor:
Reuben Wright,
By W. B. Richards,
Atty.

N. PETERS, PHOTO-LITHOGRAPHER, WASHINGTON, D. C.

UNITED STATES PATENT OFFICE.

REUBEN WRIGHT, OF CLIFTON, VIRGINIA, ASSIGNOR, BY MESNE ASSIGNMENTS, TO ROBERT H. AVERY AND CYRUS M. AVERY.

IMPROVEMENT IN STALK-CHOPPERS.

Specification forming part of Letters Patent No. 89,824, dated May 4, 1869; reissue No. 7,336, dated October 3, 1876; application filed August 16, 1876.

*To all whom it may concern:*

Be it known that I, REUBEN WRIGHT, of Clifton, county of Fairfax, and State of Virginia, have invented certain new and useful Improvements in Machines for Cutting Stalks in the field preparatory to plowing, of which the following is a full, clear, and exact description, reference being had to the annexed drawing as forming a part of this specification, together with the letters of reference marked thereon, and in which—

Figure 1:
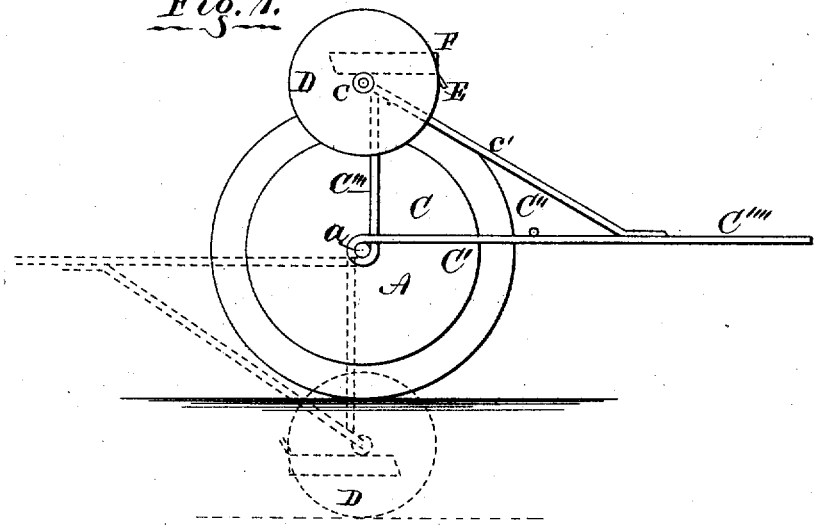
Figure 2:
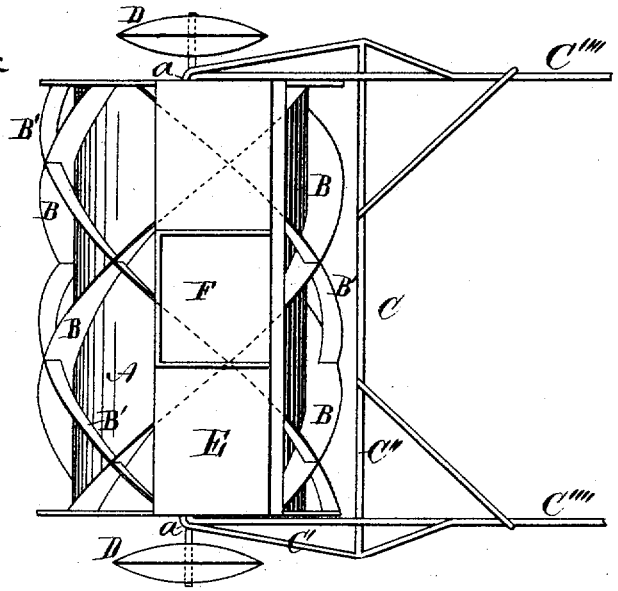
Figure 3:
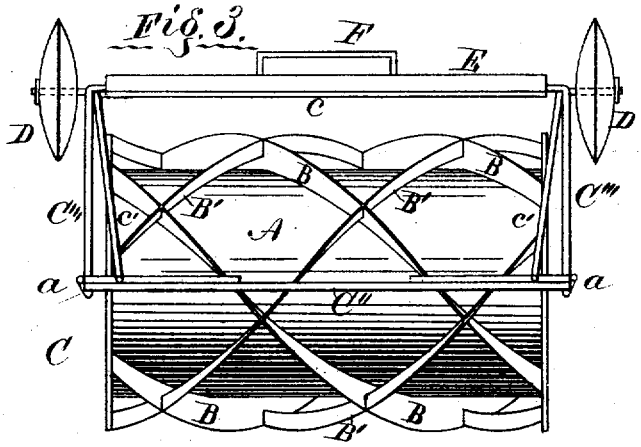

Figure 1 is a side elevation of a machine embodying my invention. Fig. 2 is a top plan view of the same. Fig. 3 is front elevation. Fig. 4 is the same view as Fig. 3, with one set of the cutting-blades removed.

This invention relates, primarily, to a machine for cutting corn-stalks and cotton-stalks into short lengths in the field, to facilitate turning them under with a plow, or for other purposes—a stalk-cutter of that class in which a cylinder of cutting-blades is operated by impact with the ground; and the first part of my invention relates to improvements in the manner of constructing and arranging the cutter-blades, adapting them, first, by their spiral form to produce smoothness and absence of jolting motion in operation in the field; and second, by the arrangement of blades upon the cylinder so as to present their cutting-edges to the soil in form to correspond with and fit over the convex form of the ridges upon which the plants grow.

The second part of my invention relates to hinging or journaling the draft-bars to the cylinder of cutters, and mounting on said draft-bars a frame and journals for wheels in such manner that by inverting the draft-bars and frame the wheels may be brought beneath the machine for local transportation, all as hereinafter fully described.

Referring to the drawings by letters, A represents a cylinder, which may be solid, as shown in the drawings, or may be framed in any suitable way to serve as a base to which the cutting-blades are attached. B B′ are the cutting blades, formed of thin plates of suitable metal with their outer edges sharpened, and each blade bent or curved in a helicoidal or spiral form, such that it may be attached to the periphery of the cylinder A, and project therefrom as a spiral flange, a transverse section of which at any point shall be radial, or nearly so, to said cylinder A. This general arrangement of the blades in helicoidal forms will present their cutting-edges to the soil obliquely to the path of the machine in operation, and also obliquely across the major part of the stalks to be cut, and will present only a portion of each blade to the ground at one time, and will relieve the machine from the jolting motion common to machines with cutter-blades parallel with the axis of the cutter-cylinder.

In addition to the advantages hereinbefore described as arising from a general spiral arrangement of the cutter-blades, a still further advantage arises from their special arrangement, as shown in the drawings. By a proper relation between the pitch of the blades and their distance apart, they may be presented to the soil in a concave form at the longitudinal center of the cutter-cylinder, so that in rolling said cutter-cylinder along the ridge upon which the plants grow it will fit over said ridge. This peculiar construction will enable the operator to keep the machine centrally along the top of the ridge of soil, and in contact with the stalks upon both sides and top of said ridge. Fig. 3 shows two sets of blades crossing each other, the blades B inclining to the right as they recede, or having a right-hand twist, and the blades B′ having a left-hand twist. The cylinder of cutters is journaled at *a* in suitable bearings in the rear side and lower corner of a frame, C, consisting of side bars C′, united at their forward ends by a cross-bar, C″, vertical bars C‴ united at their upper ends by a transverse bar, *c*, and braces *c*′. The side bars C′ are extended forward to form thills or draft-bars C⁗. The cross-bar C″ serves to bear down the standing stalks as the machine advances. The outer ends of the bar *c* are formed into journals for small wheels D. E is a cover for the cylinder of cutters, and is mounted on the bar *c*. F is the driver's seat, mounted on the cover E, which cover secures him from accidental contact with the cutters, and from débris thrown off by the cutters in operation. Figs. 2 and 3 show the machine in position for operation in the field, and the dotted lines at lower part and left hand of Fig. 1 show the manner of inverting the frame C and thills for the purpose of local transportation on the wheels D.

Having thus described my invention, what I claim as new, and desire to secure by Letters Patent, is—

1. In a stalk-cutting machine, the cutters B, of spiral form, and affixed to the cylinder A, so as to cut the stalks in rolling over them, substantially as and for the purpose specified.

2. The cutters B′, of spiral form, and affixed to the cylinder A, crossing the cutters B, substantially as described, and for the purpose specified.

3. The cutters B, of spiral form, arranged upon the cylinder A, substantially as shown, so as to present their cutting-edges to the soil in a manner adapted to fit over the convexity of the ridges upon which the stalks grow, substantially as described, and for the purpose specified.

4. The combination of the frame C, wheels D, and cylinder of cutters A, so that the frame C may be inverted, substantially as and for the purpose specified.

In testimony that I claim the foregoing as my own I affix my signature in presence of two witnesses.

REUBEN WRIGHT.

Witnesses:
F. D. RICHARDSON,
F. W. RICHARDSON.